July 20, 1948.　　　　R. W. BROWN　　　　2,445,723
RUBBER SPRING
Filed March 1, 1944　　　　　　　　　　3 Sheets-Sheet 2

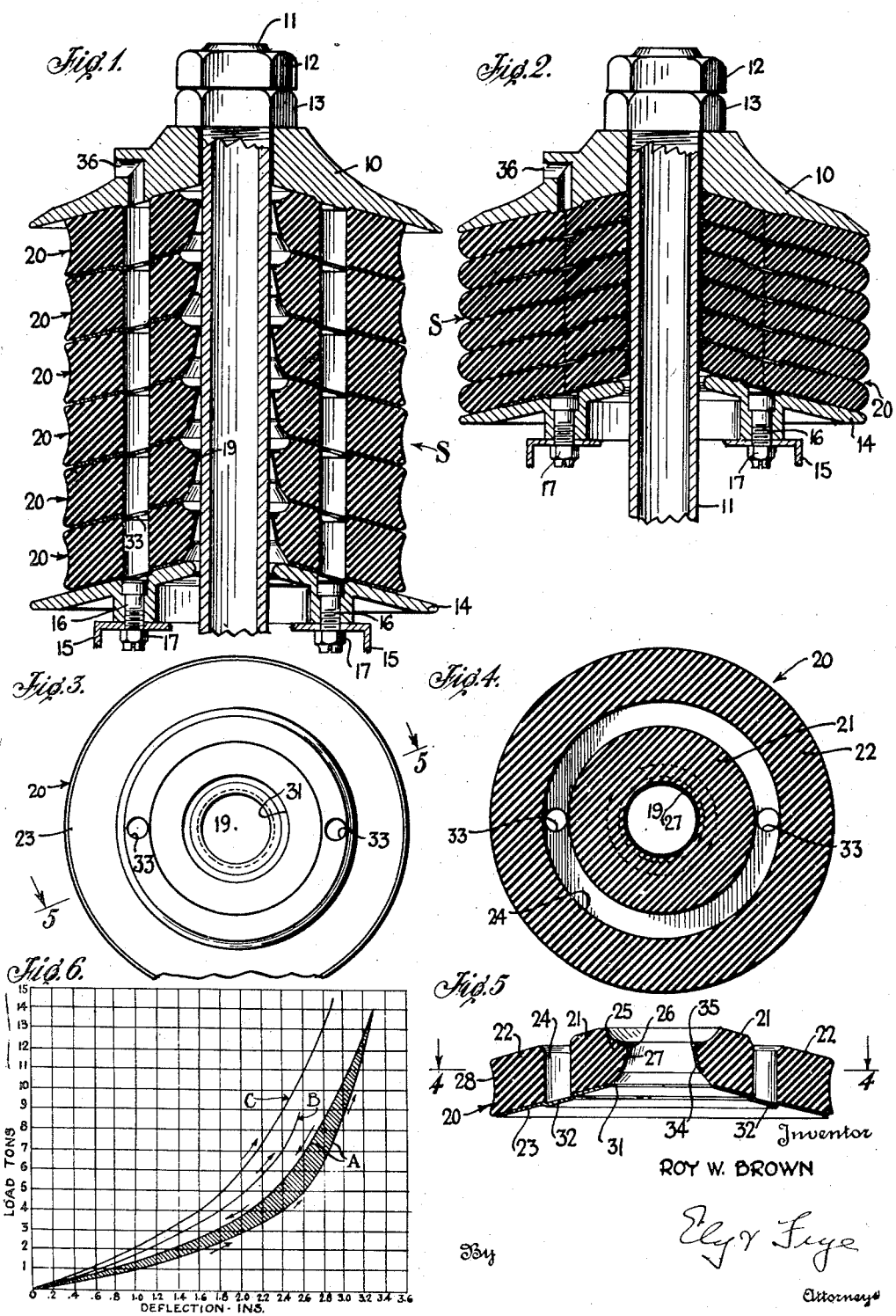

Inventor
ROY W. BROWN
By Ely & Frye
Attorneys

July 20, 1948.　　　　R. W. BROWN　　　　2,445,723
RUBBER SPRING

Filed March 1, 1944　　　　　　　　　　3 Sheets-Sheet 3

Inventor
ROY W. BROWN

By Elgy Frye

Attorneys

Patented July 20, 1948

2,445,723

UNITED STATES PATENT OFFICE 2,445,723

RUBBER SPRING

Roy W. Brown, Akron, Ohio, assignor to The Firestone Tire & Rubber Company, Akron, Ohio, a corporation of Ohio Application March 1, 1944, Serial No. 524,829

14 Claims. (Cl. 267—21)

This invention relates to rubber springs, and more particularly to rubber springs of a type adapted for use in aircraft landing gears and vehicular suspension members generally, as for example, a rubber spring adapted to be interposed between the chassis and the body of an automobile; or between the arms of a suspension parallelogram of a bogie wheel mounting in which half tracks are employed; or between the arms of a parallelogram of an automobile mounting.

The present invention consists generally of a plurality of open center cone shaped discs arranged in stack formation in cupped relation, the discs being composed of a rubber body portion attached to a strong rigid end plate.

The invention is disclosed by illustrations of specific embodiments thereof, but it is to be understood that the invention contemplates the use of the rubber spring embodying the invention in whatever form and wherever it may be found useful in accomplishing its objects. It is also to be understood that "rubber" as used in the present specification and claims, includes synthetic rubbers and rubber-like plastics, one detailed classification of which will be found by reference to Harry L. Fisher, Industrial Engineering Chemistry, volume 31, page 941 (1939).

An object of the present invention is to provide a rubber spring consisting of a plurality of rubber discs which are so shaped as to be self-stabilizing when the discs are stacked one upon the other.

Another object of the invention is to provide a rubber spring consisting of a plurality of open center rubber discs mounted about a central support tube which discs have shock absorber medium on their inner tube contacting surface.

It is another object of the invention to provide a rubber spring wherein greater resistance is provided to the compression than to the expansion or recoil stroke.

Another object of the invention is to provide a rubber spring wherein greater resistance is provided to one stroke than to its opposite stroke.

A further object of the invention is to provide a rubber spring that compresses relatively easily at the beginning of a compression stroke, but which converts itself into a solid rubber bumper as the compression stroke approaches its limit.

Yet another object is to provide an air-cooled rubber spring.

Still another object of the invention is to provide means on the periphery of discs forming a rubber spring, which means minimizes stresses under an extreme compressed condition of the disc.

Yet another object of the invention is to provide a rubber spring of substantial strength with a longitudinal central bore therethrough whose sidewalls will not buckle outwardly when the spring is subjected to severe longitudinal compression.

Another object of the invention is to support the rubber of a rubber spring in a manner which enables the rubber to support a heavier load than it would otherwise support.

A still further object of the invention is to provide a rubber spring in which worn parts may be replaced.

Other objects and advantages will be apparent to those familiar with the art as reference is had to the accompanying drawings wherein the invention is illustrated and wherein:

Fig. 1 is a diametric sectional view of a rubber spring embodying the invention shown in a mounting adapted for use in an airplane landing gear, the spring being shown in its unstressed condition;

Fig. 2 is a section similar to Fig. 1 except the spring is shown in its compressed position;

Fig. 3 is a bottom plan view of an individual spring disc;

Fig. 4 is a sectional view of a spring disc taken on line 4—4 of Fig. 5;

Fig. 5 is a diametric section of a spring disc taken on the line 5—5 of Fig. 3;

Fig. 6 is a chart illustrating the load deflection curves of the spring;

Figure 7:
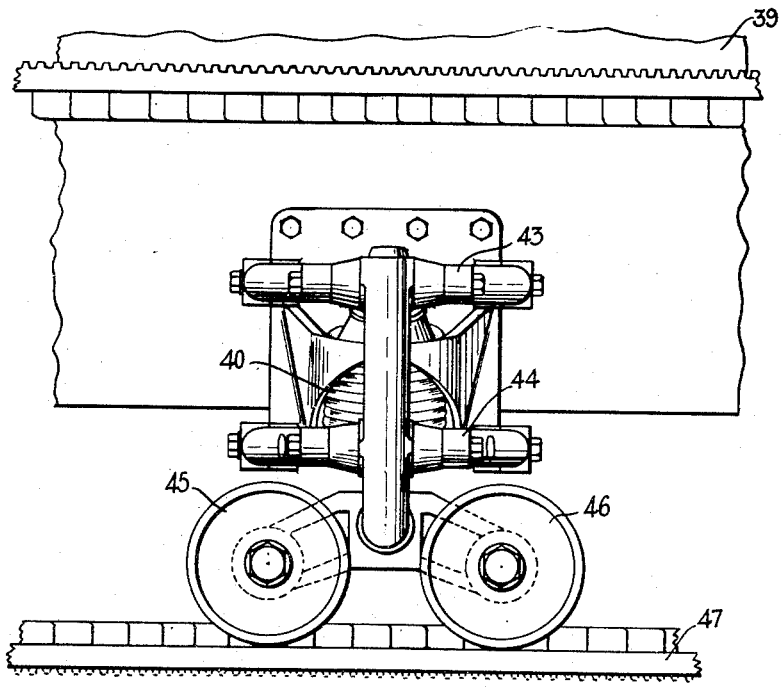
Fig. 7 is a side elevational view of a portion of a vehicle adapted to run on half-tracks, and a suspension device embodying the present invention operatively associated therewith.

Referring now in more detail to Figs. 1, 2, 3, 4 and 5 of the drawings, it will be seen that an upper support plate or head 10 receives a central guide tube 11 which is retained suspended in position by nuts 12 and 13. The support head 10 is a part of the fuselage of an airplane. A lower supporting plate or head 14 having a central opening therethrough is mounted about the guide tube 11 and on the landing gear, not shown, of an airplane by means of attachment structure 15 to which structure the head 14 is attached by means of bolts 16 and nuts 17. The structure 15 has an opening, not shown, through which the lower end of the tube 11 may project a distance sufficient to accommodate the travel of head 14 in the compression and expansion stroke of a rubber spring indicated generally as S. The spring S is composed of a plurality of conical discs 20, each having a central bore 19. The discs 20 consist of two concentric rubber rings 21 and 22 of substantial thickness. Said rubber rings have a cone shaped metallic plate 23 vulcanized to one end only thereof, the said rubber rings of each of said discs being radially spaced apart on said plate 23, said rings defining in each disc a continuous circular groove 24. In the form of the invention shown in Fig. 1 the groove 24 extends to the plate 23 thus leaving no rubber connection between rings 21 and 22. It is to be understood however that a relatively shallow thickness of rubber at the bottom of said groove may connect said concentric rings if found desirable or if it is found difficult to avoid such rubber connection in molding and vulcanizing said rings to said plate. It is also to be understood that the vertical side walls of the groove 24 shown in Fig. 5 may be formed with a bulge, a recess, or otherwise modified, if found desirable to improve the life or performance of the spring. Obviously additional rings could be substituted for the two rings 21 and 22 without avoiding the spirit of the invention and such modifications are within the contemplations of the invention. It will be seen by reference to Figs. 1 and 5 that the discs 20 are of a uniform thickness of rubber except at the radial inner edge of ring 21. The radially inner edge of each of the rings 21 defines a tapered central bore and terminates in a portion 25 of a thickness progressively reduced from the thickness of the ring 21, said portion 25 terminating in a blunt radially inner surface 26 of substantial width. A layer of fabric 27 is vulcanized to the radial inner edge of the rubber portion of each of the rings 21. The fabric 27 forms the surface 26 and extends radially outwardly for a distance from edges 34 and 35 of said surface 26. It is to be noted by reference to the drawing that the diameter of the central bore 19 is smaller at the edge 35 than at the edge 34. The fabric 27 may be of any type found to be satisfactory, as for example, a cotton duck which weighs 12 oz. to the square yard. The fabric may be prepared for application to the ring 21 by frictioning it on one side only in a regular rubberizing calendering operation; cutting it into proper size strips and attaching the strips to the inner edge of the rubber of the ring 21 before molding and vulcanization of said ring as will be readily understood by those familiar with the manufacture of rubber products. The rubberized side of said rubberized fabric is in contact with the rubber of the ring 21. The periphery or outer marginal face of ring 22 is formed with a circumferential groove 28.

The annular metallic plate or disc 23, to which the rings 21, 22 are attached, is formed with a central bore 31 and it will be noted that the diameter of the central bore 31 is greater than the diameter of the central bore 19 at the radial inner edge of ring 21. The plate 23 is formed with a concentric boss 32 which underlies the space or groove 24 between the rings 21 and 22. Air communicating holes 33 are formed through the plate 23 at its embossed portion thus providing air communication means from the groove 24 through the plate 23. It is pointed out that the metal plates 23 are subjected in service to severe strains and for that reason must be strong, as for example, .037" heat treated steel. The invention also contemplates forming a bead, spinning a turned edge or otherwise modifying the edges of the sides of the holes 33 to prevent a plate rupture starting at that point and to make possible the use of lighter gauge metal for the plate 23 than otherwise would be possible. The metal composing the plate 23 may be treated in any satisfactory manner to promote a good union between the rubber rings 21 and 22 and the said plate. A good union between the rings 21 and 22 and the plate 23 is important. Also the rubber of said rings may be compounded to facilitate the union between said rings and plate all of which will be understood by those skilled in the compounding of rubber. The plate 23 is originally formed to substantially conform to and fit upon the top surface of the support 14 and the top or convex surface of the discs 20.

As indicated hereinbefore the discs 20 are vulcanized in molds in the usual manner of molding rubber products, the steps of which procedure are common knowledge of the rubber industry and therefore are not set out in detail. After a disc 20 has been molded and vulcanized the fabric 27 is impregnated by dipping or in any other manner found satisfactory, with a thixotropic lubricant, as disclosed in my copending application Serial No. 462,060 filed October 14, 1942.

By referring to Figs. 1 and 2 it will be seen that the rubber discs 20 are disposed at an acute angle to the plane of the central tube 11. It will also be seen in Fig. 1 that the edge 35 of the surface 26 of the fabric 27 is a sharper edge than edge 34 and that edge 35 extends radially inwardly closer to the tube 11 than does edge 34 when the discs 20 are in unstressed condition as shown in Fig. 1.

In operation the stack of rubber discs 20 progressively change from their unstressed condition shown in Fig. 1 to the compressed condition shown in Fig. 2 and then back again to the unstressed condition as the heads 10 and 14 approach and move away from each other in a reciprocating motion to which vehicular suspensions are subjected as will be understood by those familiar with the art. When an airplane or other vehicle is running on the ground the suspension springs are in constant motion of compression or expansion strokes. Heavy vehicles subject the suspension springs to severe compression strains and the sway and momentum of the sprung weight of the vehicle is a severe strain on the stability of suspension springs. Then, too, and it is important, such suspension springs must necessarily be of considerable length and heretofore such springs when heavily loaded in a compression stroke would buckle. Applicant's rubber spring at the beginning of a compression stroke presents a stack of discs 20 with a sharp edge 35 near or making contact with the central guide tube 11. As the rubber of the rings 21 and 22 becomes compressed between head 14 and head 10, the rubber in the disc 20 becomes distorted and bulges radially outwardly and inwardly wherever it is free to do so. The adhesion of the rubber of each ring 21 and 22 to their metallic plates 23 tends to hold the rubber in position and to prevent the rubber's distortion and thereby substantially increases the amount of load the rubber will support. As the bulge of said rubber progressively increases it tends to close the grooves 24 between the rings and as the discs 20 are stacked, applicant has provided means through which air in said grooves may escape, thus making the total space in said grooves available to receive distorted rubber. The holes 33 provide the air outlet means and it will be seen that air in the grooves 24 will flow ahead of the rubber bulging into said grooves, the air traveling around the grooves which communicate through the holes 33 and finally out to the atmosphere through a hole 36 in the head 10, said hole 36 communicating with the groove 24 of the top disc of the stack of discs 20 composing the body of the rubber spring.

The work done by rubber generates heat and heretofore it has been a problem to be able to use a sufficient volume of rubber to support the required load to which vehicular suspension springs were subjected and not have the rubber destroyed by the heat generated. Applicant's invention provides positive air cooling means for the rubber of the spring. While the air is forced out of the grooves 24 through the opening 36 the process is reversed when the groove becomes free of bulging rubber and fresh cool air rushes into the grooves 24 where the fresh air becomes heated by radiation from the rubber at the sides of said grooves. Thus it will be seen that when a rubber spring embodying this invention is actuated, that the air within the grooves 24 is either partially or wholly replaced with each stroke of the rubber spring, the amount of air replacement depending on the length of the stroke.

Under compression ring 22 bulges radially outwardly at its outer periphery as shown in Fig. 2. As is well known by those familiar with the art, sharp unsupported bulging of rubber tends to destroy the rubber subjected to such bulging. Applicant conceived the idea of relieving the localizing of the strain on the rubber at the periphery of the ring 22 by forming a peripheral groove 28 thereon which involves substantially the entire outer peripheral width of the disc. Thus the rubber in the peripheral groove portion of a disc 20 will pass through a compression period at the beginning of a compression stroke of the spring and as the compression continues, the rubber will be distorted into an unsupported radially outwardly extending bulge over which the rubber in said peripheral groove portions is stretched. It will be seen that the amount of stretch and strain to which this particular portion of rubber would otherwise be subjected is substantially relieved due to the said peripheral groove the present invention embodies. Applicant has found the groove 28 effective in preventing the rubber of ring 22 from rupturing at its outer distorted edges.

The relative position of the parts constituting the assembly shown in Fig. 1, wherein the spring is in its unstressed position, is such that as stated above, the edge 35 is near contact, but is not pressed against the outer surface of the tube 11. As the bottom head 14 moves toward the head 10 the central guide tube-constacting portions of the discs 20 slide on the surface of said tube.

However under the compressing effect of the movement of the head 14 in its compression stroke, the rubber in said discs is bulged radially inwardly toward the tube 11. This results in the sharp edge 35 being pressed and flattened against said tube 11 which results in an immediate drag or resistance to the compression stroke. As the bulge of the said rubber increases the area of contact of the surface 26 against the tube 11 progressively increases until the discs combine to present an unbroken contact of the surface 26 to the tube 11. It will be understood that as this latter condition develops, the pressure and the area of the surface 26 against the said tube increases, which sets up an increasingly greater resistance to the compression stroke as it approaches the limit of such stroke. This resistance is also affected by the plate 23 being vulcanized to the bottom side only of each disc 20 and by the disc being at an acute angle to the plane of the tube 11. As the sharp edge 35 begins to press against tube 11 in said compression stroke, the edge drags and involves the rubber lying above it or between it and the plate 23 vulcanized to the disc 20 next above it. However, since the rubber between edge 35 and the plate of the disc next above is free to move, except for its frictional contacts, it will be seen that the rubber of the said portion 25, of the ring 21, as well as a portion of the rubber of the ring 21 itself, is both drawn and compressed radially inwardly against the surface of the tube 11 when the rubber spring moves in its compression stroke and that the said contact of the discs 20 against the guide tube sets up a high frictional resistance to the compression stroke. It will now be readily seen that substantially the opposite frictional condition obtains in the recoil or expansion stroke. In the expanding stroke, the blunt edge 34 slides easily over the surface of the tube as it simultaneously moves radially outwardly therefrom and the slant of the conical discs extends with the direction of the drag of the surface 26 and accordingly no pointed or end portions are being thrust endwise against said tube surface. Thus it will be seen that the present invention provides a rubber suspension spring which automatically involves substantial resistances to a compression stroke which is in addition to the normal load bearing qualities of the rubber used. To increase this effectiveness of the resistance to the compression stroke and to deaden or quiet the activity of the spring, the layer of fabric 27 is impregnated with a thixotropic lubricant. By this expedient an excessive amount of action or sliding of the surface 26 against the surface of the tube 11 will cause said lubricant to become viscous. Thixotropic lubricants which have been successfully used are disclosed in my copending application referred to above. It is to be understood that the fabric 27 provides a shock absorbing means for the discs 20 as well as a lubricated wearing surface.

At the beginning of the compression stroke the discs 20 compress easily providing a sensitive spring according to the amount and type of rubber used relative to the load. However as the compression of the rubber increases its resistance to deflection increases, as may be seen by reference to the chart illustrating the load deflection curves shown in Fig. 6. As the surface 26 of the portion 25 presses against the tube 11 and as the straight sides of the grooves 24 bulge into contact as they will do, the spring approaches the nature of a rubber bumper until no more space is left in the groove 24 or between the tube 11 and the rings 21. When this condition is reached as shown in Fig. 2 then the spring functions as a rubber bumper or resilient mounting providing a rubber insulator between the chassis and running gears of a vehicle. This is important as the rubber spring cannot be injured by bottoming as happens when a vehicle is driven over unusually large bumps or into deep depressions.

While the central guide tube 11 exerts some influence in stabilizing the stack of discs 20 such means would not alone be satisfactory to produce a stable stack under high pressure. Applicant conceived the idea of stabilizing the stack of discs 20 by the general shape of the discs and by means formed on the plates 23. Accordingly, a feature of the discs is a conical shape so that the discs can be formed into a stack by cupping one into another. To exactly align the discs in such a stack the relatively narrow boss 32 is designed to project into the opening of the slot 24 of the next lower disc in a stack of discs forming said rubber spring. By these means the stack locks together and is stabilized without the use of extraneous means.

If the plates 23 were to be omitted from the rubber spring illustrated in Fig. 1 and the spring were to be compressed as shown in Fig. 2, then the stack of rubber discs would bulge outwardly away from the guide member 11 and escape from between the two heads 14 and 10. Thus it is that the present invention makes possible the exerting of a severe longitudinal compression and pressure on a rubber spring of substantial length without bending or buckling such spring. To accomplish this, the plates 23 are vulcanized to the bottom of the rubber rings of the discs 20 and as indicated hereinbefore, said plates are provided with annular bosses 32 adapted to fit into and cooperate with the grooves 24 to align and then to hold the stack of discs 20 in alignment.

Each disc 20 is a separate unit in itself and is removable and replaceable in the said stack of discs. If the rubber or a plate of a disc should fail, or if the rubber of a disc should become separated from its plate, as sometimes happens when the discs have been in long, hard service, then such disc may be removed and replaced. This replacement feature is important, not only as a matter of economy, but it also makes possible maintaining the rubber spring at a high efficiency level.

Figure 8:
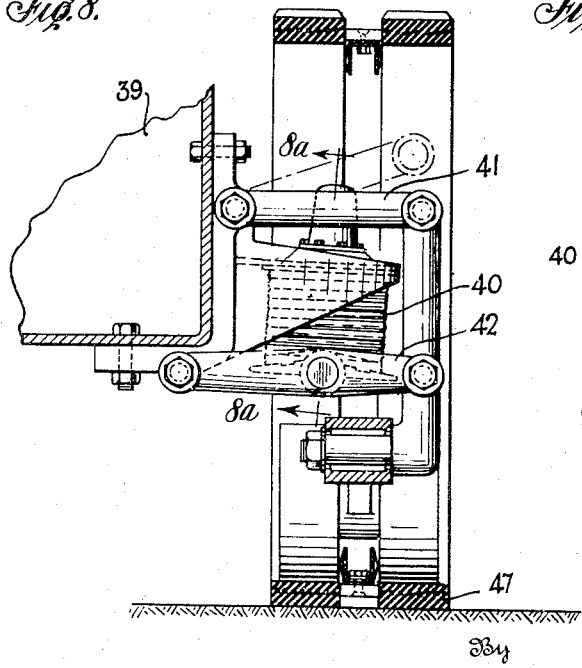
Fig. 8 is an elevation of the structure shown in Fig. 7 as viewed from the left thereof, a part being broken away and in section.
Figure 8A:
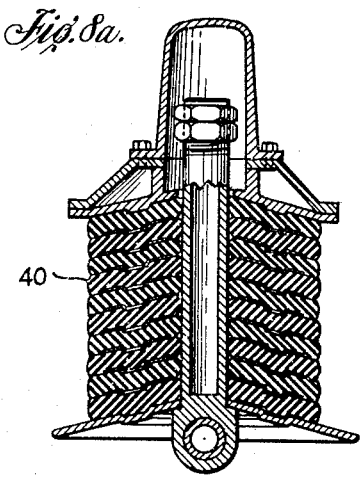
Fig. 8a is an enlarged section through the rubber spring taken on line 8a—8a of Fig. 8, the spring being shown under normal load.

Referring now to Figs. 7 and 8, there is shown how a rubber spring referred to generally as 40, may be interpositioned between the suspension arms 41, 42, 43 and 44 of a military tank or a tractor 39 and the bogie wheels 45 and 46, which wheels run on a half-track 47.

Figure 9:
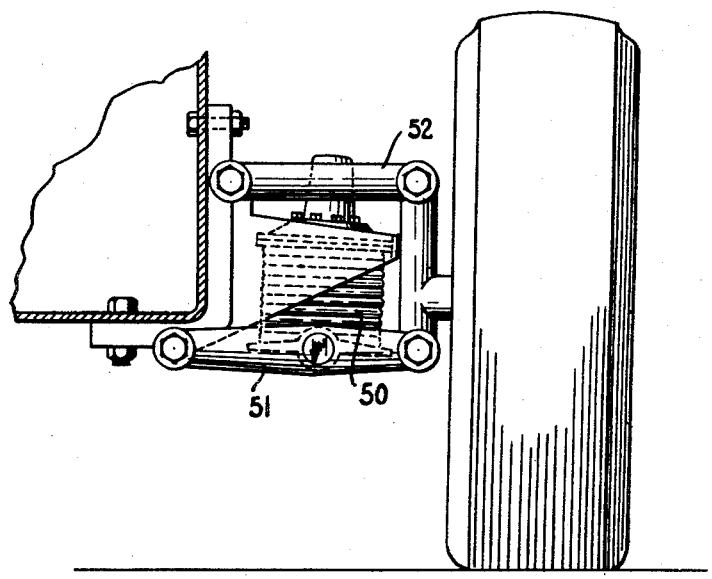
Fig. 9 is a fragmentary front elevation of a motor vehicle, and a rubber spring embodying the present invention operatively associated therewith, the spring being shown as a vertical suspension member inter-positioned between the arms of a suspension parallelogram.
Figure 10:
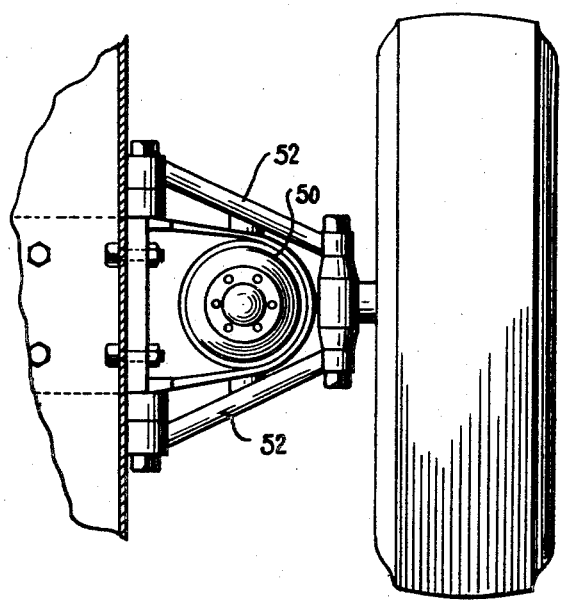
Fig. 10 is a plan view of the structure shown in Fig. 9.

Figs. 9 and 10 illustrate a spring 50 embodying the present invention used as a vertical suspension spring for an automobile and being interposed between the arms 51 and 52 of a parallelogram mechanism such as commonly used to position the axle and wheel of an automobile.

The rubber springs 40 and 50 shown in Figs. 7 and 9 do not differ in any essential features of construction or operation from the spring shown in Fig. 1 and described in detail; therefore, a detailed discussion of the springs 40 and 50 appears to be unnecessary. These latter figures are intended to disclose, but without limitation, only some of the many uses to which the invention may be adapted.

Referring to Fig. 6 the graph shows load plotted against deflection of a typical rubber spring. The curve A is produced in a testing machine by progressive additions of load as shown by the arrows ascending on the lower edge of the shaded portion. When the desired maximum load is arrived at, the testing machine is reversed so that load is progressively removed from the rubber spring. The relationship between load and deflection is then shown by the upper edge of the shaded portion and is indicated by arrows pointing downward. The difference between these two curves represents an area which in turn represents energy which has, for the duration of the test, been stored in the rubber. This is commonly referred to as hysteresis, damping, or more popularly "shock absorption." Since the function of any suspension spring is to carry varying instantaneous loads, it becomes important to supplement the above described static condition with loads applied in time intervals simulating those occurring in service (much faster than can be applied by the conventional testing machine). Consequently, the vehicle to which the spring is attached is lifted upward and suddenly dropped and the instantaneous values of loads and deflection plotted. Curve B shows such instantaneous values for a nine inch drop, and curve C for a 19 inch drop. The difference between the instantaneous drop values, curves B and C in comparison to corresponding points on curve A serve as a criteria of the improved performance under dynamic conditions simulating those encountered in service. The valuation may be summarized through the energy represented by corresponding points, thus, B and C will carry momentary loads some 20–40 per cent greater than the static condition as indicated by A. The area represented by the hysteresis loop A may also include non-recoverable energy which is dissipated as heat through the frictional contact between the friction material of the inner lining of the rubber spring bushing and the outer surface of the metal tube with which it engages. The combination provides a simple structure having increased momentary load capacity and a very much increased "shock absorber" effect as compared to that heretofore available from any known elastic element constructed of rubber or rubber-like materials.

The invention is capable of receiving a variety of mechanical expressions some of which are illustrated in detail in the drawings; but it is to be expressly understood that the drawings are for the purposes of illustration only and are not to be construed as a definition of the limits of the invention, reference being had to the appended claims for that purpose.

I claim:

1. A rubber spring of the class described consisting of a plurality of contacting discs, each of said discs having a plurality of concentric rubber rings permanently attached to the convex surface only of a relatively thin strong conical shaped metallic plate, the concentric rubber rings of each of said discs being formed with conical surfaces opposite said permanently attached surfaces, each of said conical surfaces having frictional engagement with the confronting concave surface of an adjacent metallic plate.

2. In a device of the character described, a plurality of discs in stacked relation, each of said discs consisting of a thin conical metal plate having a central bore, a plurality of concentric rubber rings of substantial thickness attached to the convex surface only of said plate, said rings being radially spaced defining grooves therebetween.

3. In a device of the character described, a plurality of discs in stacked relation, each of said discs consisting of a thin conical metal plate having a central bore, a plurality of concentric rubber rings of substantial thickness attached by vulcanization to the convex surface only of said plate, said rings being radially spaced defining a groove therebetween, each of said plates having a boss formed on its concave side underlying said groove and being adapted to project into the groove of an underlying disc of the stack.

4. In device of the character described, a plurality of discs in stacked relation, each of said discs consisting of a thin conical metal plate having a central bore, a plurality of concentric rubber rings of substantial thickness attached to the convex surface of said plate, said rings being radially spaced defining a groove therebetween, each of said plates having a boss formed on its concave side underlying said groove and being adapted to project into the groove of an underlying disc of the stack, said plate having at least one opening therethrough formed in said boss and opening into said groove.

5. In device of the character described, a plurality of discs in stacked relation, each of said discs consisting of a thin conical metal plate having a central bore, a plurality of concentric rubber rings of substantial thickness attached to the convex surface of said plate, said rings being radially spaced defining a groove therebetween, each of said plates having a boss formed on its concave side underlying said groove and being adapted to project into the groove of an underlying disc of the stack, said plate having at least one opening therethrough formed in said boss and opening into said groove, the inner ring of said concentric rings having a radially inwardly projecting annularly extending portion of substantially reduced thickness relative to said inner ring.

6. In device of the character described, a plurality of discs in stacked relation, each of said discs consisting of a thin conical metal plate having a central bore, a plurality of concentric rubber rings of substantial thickness attached to the convex surface of said plate, said rings being radially spaced defining a groove therebetween, each of said plates having a boss formed on its concave side underlying said groove and being adapted to project into the groove of an underlying disc of the stack, said plate having at least one opening therethrough formed in said boss and opening into said groove, the inner ring of said concentric rings having a radially inwardly projecting annularly extending portion of substantially reduced thickness relative to said inner ring, said portion terminating in a layer of friction fabric.

7. In a device of the character described, a plurality of discs in stacked relation, each of said discs consisting of a thin conical metal plate having a central bore, a plurality of concentric rubber rings of substantial thickness attached to the convex surface of said plate, said rings being radially spaced defining a groove therebetween, each of said plates having a boss formed on its concave side underlying said groove and being adapted to project into the groove of an underlying disc of the stack, said plate having at least one opening therethrough formed in said boss and opening into said groove, the inner ring of said concentric rings having a radially inwardly projecting annularly extending portion of substantially reduced thickness relative to said inner ring, said portion terminating in a layer of friction fabric, said fabric being impregnated with a lubricant.

8. In device of the character described, a plurality of discs in stacked relation, each of said discs consisting of a thin conical metal plate having a central bore, a plurality of concentric rubber rings of substantial thickness attached to the convex surface of said plate, said rings being radially spaced defining a groove therebetween, each of said plates having a boss formed on its concave side underlying said groove and being adapted to project into the groove of an underlying disc of the stack, said plate having at least one opening therethrough formed in said boss and opening into said groove, the inner ring of said concentric rings having a radially inwardly projecting annularly extending portion of substantially reduced thickness relative to said inner ring, said portion terminating in a layer of friction fabric, said fabric being impregnated with a thixotropic lubricant.

9. In device of the character described, a plurality of discs in stacked relation, each of said discs consisting of a thin conical metal plate having a central bore, a plurality of concentric rubber rings of substantial thickness attached to the convex surface of said plate, said rings being radially spaced defining a groove therebetween, each of said plates having a boss formed on its concave side underlying said groove and being adapted to project into the groove of an underlying disc of the stack, said plate having at least one opening therethrough formed in said boss and opening into said groove, the inner ring of said concentric rings having a radially inwardly projecting annularly extending portion of substantially reduced thickness relative to said inner ring, said portion terminating in a layer of friction fabric, said fabric being impregnated with a thixotropic lubricant, the said inner ring having a central opening whose sides are tapered radially outwardly toward said metal plate.

10. In device of the character described, a plurality of discs in stacked relation, each of said discs consisting of a thin conical metal plate having a central bore, a plurality of concentric rubber rings of substantial thickness attached to the convex surface of said plate, said rings being radially spaced defining a groove therebetween, each of said plates having a boss formed on its concave side underlying said groove and being adapted to project into the groove of an underlying disc of the stack, said plate having at least one opening therethrough formed in said boss and opening into said groove, the inner ring of said concentric rings having a radially inwardly projecting annularly extending portion of substantially reduced thickness relative to said inner ring, said portion terminating in a layer of friction fabric, said fabric being impregnated with a thixotropic lubricant, the said inner ring having a central opening whose sides are tapered radially outwardly toward said metal plate, the outer ring of said concentric rings having a circumferentially extending peripheral groove, said groove being a substantial portion of the peripheral edge of said outer ring.

11. A rubber suspension spring for vehicles and the like comprising a top support plate attached to the body of a vehicle, a bottom support plate attached to the running gear of said vehicle, a tubular control guide member extending through the central portion of said top plate and being fixedly attached thereto, said tubular member projecting downwardly from said top plate and extending through a central bore in said bottom plate, said top and bottom plates having conical supporting faces, the supporting face of the top plate being concave and that of the bottom convex, said top and bottom supporting plates being held in separated relation by resilient means consisting of a plurality of concavo-convex discs stacked in cupped relation and being interpositioned between said support plates, said discs having tapered central bores through which said tubular member projects, each of said discs consisting of a plurality of concentric rubber rings of substantial thickness permanently attached to the convex surface of a thin conical rigid plate, the inner ring of said disc terminating on its radially inner surface in a central tube contact portion of less thickness than the body thickness of the concentric rings, said central bore tapering radially inwardly and away from said conical plate, said tube contact portion having a covering layer of fabric, said fabric being impregnated with a thixotropic lubricant, the periphery of the outer of said concentric rings having a circumferential groove therein, said concentric rings being spaced apart defining a groove therebetween, said conical metallic plates having circumferentially extending aligned axially projecting bosses, said bosses underlying said grooves and having at least one air communicating hole through each of said bosses, said bottom support plate having recessed portions which receive the said boss on the adjacent disc of said stacked discs and said top supporting plate having an air outlet opening communicating with the groove defined between said concentric rings of the top disc of said stack.

12. In a device of the character described, the combination of a vehicle, opposed top and bottom supporting plates, said top plate being associated with the body and said bottom plate with the running gear of said vehicle, a stack of resilient conical discs arranged in cupped relation interpositioned between said opposed plates, said discs consisting of a plurality of concentric resilient rings arranged in radially spaced relation, and rigid plates concavo-convex in cross-section, with the convex sides of said plates attached to one end only of said rings, a central bore through said discs, a cylindrical connection member projected through said bore, said member being rigidly attached to said bottom plate and pivotally mounted relative to the lower arms of a parallelogram associated with the axle and wheel of said vehicle.

13. In combination, a supporting member, a supported member, a spring between said members, said spring comprising a stack of conical shaped open center discs in cupped relation, each of said discs comprising a body portion of at least two concentric rings of rubber of substantial thickness, said rings of each disc being permanently attached to the convex side only of a thin metal disc, a rigid guide member projected from said supported member into said openings of the discs.

14. In combination, a supporting member, a supported member, a spring between said members, said spring comprising a stack of conical shaped open center discs in cupped relation, each of said discs comprising a body portion of at least one ring of rubber of substantial thickness, said rubber ring or rings of each disc being permanently attached to the convex side only of a thin conical-shape metal disc, a rigid guide member projected from said supported member into said openings of the discs.

ROY W. BROWN.

REFERENCES CITED

The following references are of record in the file of this patent:

UNITED STATES PATENTS

| Number | Name | Date |
|---|---|---|
| 7,706 | Ray | Oct. 8, 1850 |
| 1,744,551 | Karcher | Jan. 21, 1930 |
| 2,039,758 | Webb | May 5, 1936 |
| 2,058,623 | Protzeller et al. | Oct. 27, 1936 |
| 2,087,156 | Johnson | Jan. 16, 1940 |
| 2,215,743 | Saurer | Sept. 24, 1940 |

FOREIGN PATENTS

| Number | Country | Date |
|---|---|---|
| 134,056 | Great Britain | Nov. 6, 1918 |
| 432,304 | Great Britain | July 24, 1935 |
| 549,020 | Great Britain | Nov. 3, 1942 |
| 762,631 | France | Jan. 22, 1934 |